(No Model.)

G. DE GRAFF.
SPROCKET WHEEL.

No. 538,324. Patented Apr. 30, 1895.

Witnesses

Inventor
George De Graff,
By his Attorneys.

UNITED STATES PATENT OFFICE.

GEORGE DE GRAFF, OF HOLTON, KANSAS.

SPROCKET-WHEEL.

SPECIFICATION forming part of Letters Patent No. 538,324, dated April 30, 1895.

Application filed January 30, 1895. Serial No. 536,694. (No model.)

*To all whom it may concern:*

Be it known that I, GEORGE DE GRAFF, a citizen of the United States, residing at Holton, in the county of Jackson and State of Kansas, have invented a new and useful Sprocket-Wheel, of which the following is a specification.

My invention relates to a sprocket or chain wheel adapted especially for use in connection with bicycles and similar vehicles, the objects in view being to provide a wheel by which motion may be communicated either forward or backward to a drive-chain, and which, in addition thereto, may be released to provide for coasting without requiring the rotation of the cranks; and furthermore, to provide means for connecting the parts of the sprocket-wheel, whereby the desired adjustment may be attained by means of the cranks and without the use of auxiliary devices.

Further objects and advantages of this invention will appear in the following description, and the novel features thereof will be particularly pointed out in the appended claims.

Figure 1:
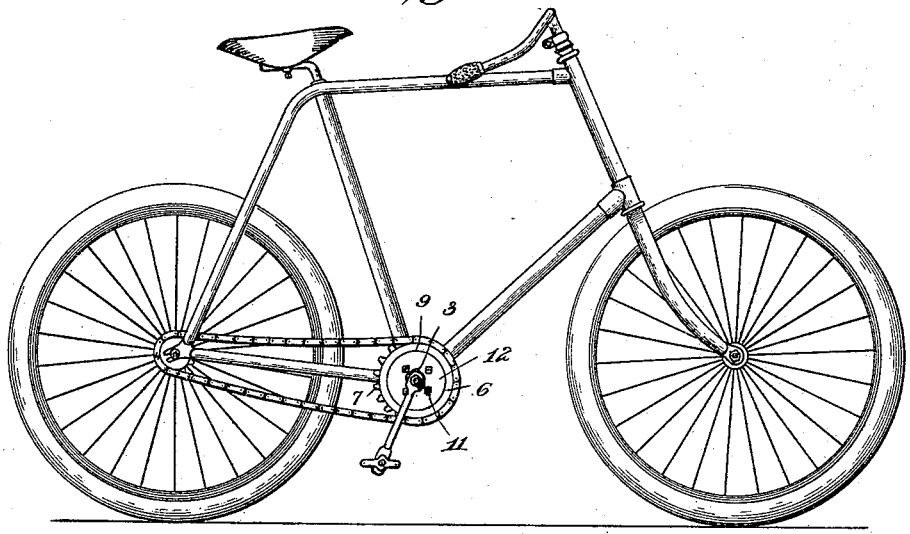
Figure 4:
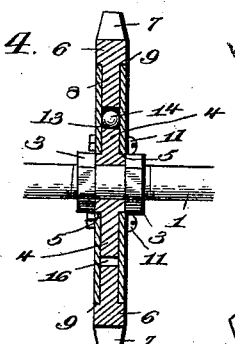
Figure 2:
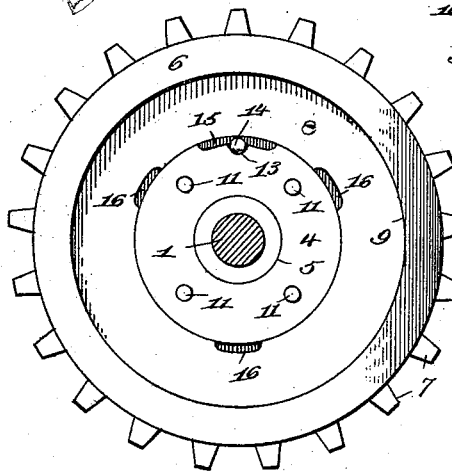
Figure 3:
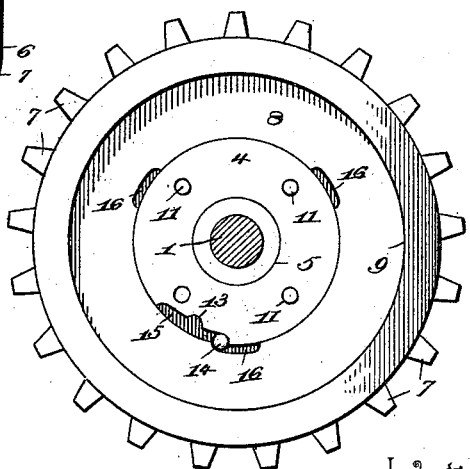

In the drawings: Figure 1 is a side view of a bicycle provided with a sprocket-wheel constructed in accordance with my invention. Fig. 2 is a detail view of the sprocket-wheel with the face-plate removed, showing the clutch ball or roller arranged in the central or releasing socket. Fig. 3 is a similar view, showing the clutch ball or roller in one of the locking seats, whereby the sprocket-ring is locked to the core. Fig. 4 is a transverse sectional view of the sprocket-wheel.

Similar numerals of reference indicate corresponding parts in the several figures of the drawings.

1 designates a driving-shaft, to which is permanently secured, by means of suitable nuts 3, a core 4, which forms one member of the improved sprocket-wheel. This core is disk-shaped and is provided at opposite sides, near its center, with concentric bearing-shoulders 5. The sprocket-ring 6 is provided with exterior spurs 7, and with an interior concentric web 8, which is equal in thickness to the said core. The web being of less thickness than the sprocket-ring, an annular shoulder 9 is provided concentric with the said shoulders upon opposite sides of the core, and fitting between these concentric shoulders, and secured to the core by means of the bolts 11, are the opposite annular face-plates 12, the outer edges of these face-plates fitting snugly against the shoulders, near the periphery of the sprocket ring.

The core is provided in its periphery with a releasing socket 13, for the reception of a ball or roller 14, the depth of this socket being greater than the diameter of the ball or roller, whereby, when the latter is in the socket, its outer surface is not in contact with the inner periphery of the sprocket-ring, or the reduced web, which forms a part of said ring. The periphery of the core is further provided, upon opposite sides of the said socket, with shallow recesses or notches 15, the depth thereof being less than the diameter of the ball or roller, whereby it is only when one of said recesses or notches registers with one of the seats 16, in the inner periphery of the sprocket-ring, that the ball or roller can leave the socket. When one of said notches is opposite a seat in the sprocket-ring and the ball or roller becomes released from the socket, it forms a clutch by occupying a position between the opposing terminals or shoulders of the seat and the notches or recesses, whereby rotary motion in either direction may be communicated from the core to the sprocket-ring.

The socket in the core is arranged in a definite position with relation to the cranks attached to the driving-shaft, whereby the location of the socket may be ascertained by the position of the cranks, and hence when it is desired to disengage the sprocket-ring from the core, the cranks must be arranged in that position which will cause the socket to stop above the driving-shaft, whereupon the ball or roller will drop from engagement with the seats and notches and will be received in the socket. From this position the driving-shaft may be turned in either direction to cause the re-engagement of the sprocket-ring with the core, for the reason that as soon as the socket reaches a point below the plane of the driving-shaft the ball or roller will leave the same and enter a seat and thus enable the operator to communicate either forward or backward motion to the sprocket-ring. Thus the engagement and disengagement of the parts of the sprocket-wheel may be attained without removing the feet from the cranks, and without the use of auxiliary devices.

Various changes in the form, proportion, and the minor details of construction may be resorted to without departing from the principle or sacrificing any of the advantages of this invention.

Having thus described the invention, I claim—

1. In a sprocket-wheel, the combination of a core provided with a peripheral socket and communicating notches or recesses of less depth than the socket, and extending upon opposite sides thereof a sprocket-ring provided in its inner periphery with a seat of less depth than said socket and adapted to be arranged in registration with said socket and notches, and a ball or roller adapted to be seated in said socket or engage registering seats and recesses, substantially as specified.

2. In a sprocket-wheel, the combination of a core provided with a peripheral socket and communicating shallow notches which extend on opposite sides of the peripheral socket, a sprocket-ring provided contiguous to the periphery of the core with shallow seats, said seats and notches having abrupt terminal shoulders and being approximately one-half the depth of said socket, and a ball or roller adapted to be received in said socket or engage registering seats and notches, substantially as specified.

3. In a sprocket-wheel, the combination of a core having flat opposite sides and concentric lateral bearing shoulders, a sprocket-ring having a reduced inner web arranged at its inner periphery contiguous to the periphery of the core, said contiguous peripheries being provided, respectively, with seats and notches, the latter of which communicate with and extend upon opposite sides of sockets of greater depression than the notches, a ball or roller arranged in said socket and adapted to engage registering seats and notches, the sprocket-ring being provided, near its periphery, with lateral annular shoulders arranged in planes corresponding with the bearing shoulders of the core, face-plates arranged between said shoulders, and means for securing the same in place, substantially as specified.

In testimony that I claim the foregoing as my own I have hereto affixed my signature in the presence of two witnesses.

GEORGE DE GRAFF.

Witnesses:
ALEX. DUNN, Jr.,
R. R. CHRISMAN.